Figure 1:
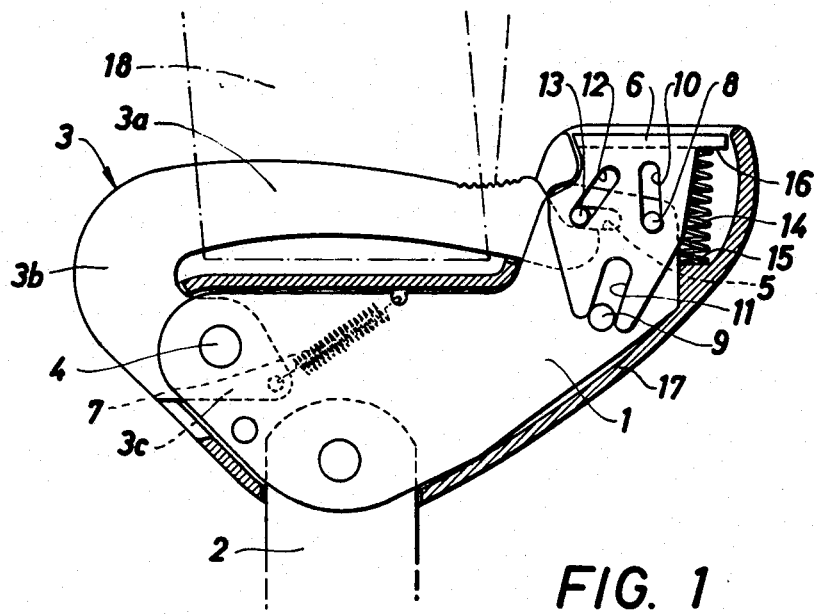

United States Patent [19]

Nilsson

[11] 3,920,265

[45] Nov. 18, 1975

[54] DEVICE IN CONNECTION WITH ROLLER SAFETY BELTS OR SIMILAR

[76] Inventor: Karl Erik Nilsson, Roentgenstrasse 30, D-8012 Ottobrunn, Munich, Germany

[22] Filed: Sept. 19, 1973

[21] Appl. No.: 398,764

[30] Foreign Application Priority Data
Sept. 25, 1972 Sweden............................ 12345/72

[52] U.S. Cl..... 280/150 SB; 24/241 PS; 24/241 SB; 297/389
[51] Int. Cl.²......................................... B60R 21/10
[58] Field of Search....... 280/150 SB; 297/388, 389; 24/241 PS, 241 SB, 170

[56] References Cited
UNITED STATES PATENTS

| 2,271,133 | 1/1942 | Thoresen................................ 24/170 |
| 2,559,999 | 7/1951 | Regan................................ 24/241 PS |
| 2,874,431 | 2/1959 | Elsner........................... 24/241 PS X |
| 3,510,151 | 5/1970 | Weman......................... 280/150 SB |
| 3,844,001 | 10/1974 | Holmberg.............................. 297/389 |

Primary Examiner—David Schonberg
Assistant Examiner—Michael J. Forman
Attorney, Agent, or Firm—Ulle C. Linton

[57] ABSTRACT

A coupling device for roller safety belts particularly of the three point type belt having a diagonal chest band portion which continues into a hip band portion with both portions at one point being laid around a bar fastened to the vehicle at one side of a seat of the vehicle and a coupling device including said bar which is pivotally journalled on a shaft extending perpendicular to one end of said bar. Said bar has a bridge portion around which the safety belt can be laid extending laterally beyond said shaft in both directions and means for releaseably retaining said bar across the safety belt when positioned under said bar.

1 Claim, 2 Drawing Figures

DEVICE IN CONNECTION WITH ROLLER SAFETY BELTS OR SIMILAR

The present invention relates to a device in connection with roller safety belts or similar for vehicles and more particularly of the three point type comprising a chest band portion extending diagonally during the use of the safety belt, which chest band portion continues in a hip band portion, both portions at the point of passing from one section to the other being laid around a bar located at one side of and at the vehicle seat in question, which bar is mounted on the floor or on the chassis of the vehicle.

It is a principal object of the invention to provide a coupling means for safety belts of the kind mentioned, which is comparatively insensitive to a strong pull appearing in the band of the safety belt and which can be easily detached.

Said object is reached by a device according to the invention, which device in principle is characterized by the bar being supported in a fitting, fastened to said floor etc., in which fitting said bar is pivotably journalled on a shaft perpendicularly extending at one end of the bar, which latter one is shaped in such a manner that in one of its pivoting positions, i.e. in the functioning position of the safety belt, it extends with a portion in bridge shape over a portion of said journalling fitting, the bridge portion crossing said shaft at a distance from the same, so that the band of the safety belt in functioning condition, i.e. when it is laid around said bridge portion, extends past the shaft in both directions counted in the cross direction of the band.

Figure 2:
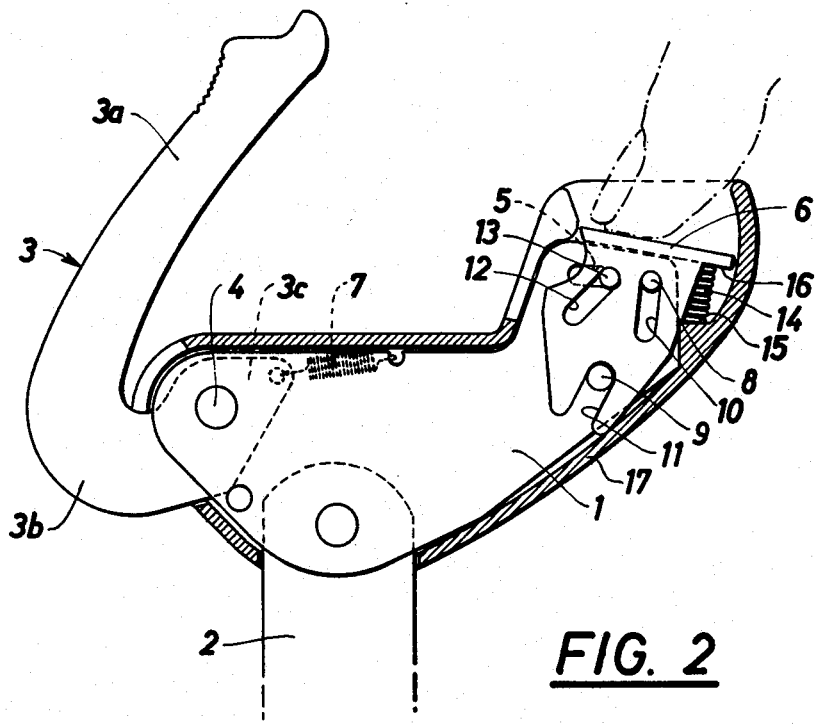

An example of an embodiment of the object of the invention is described below more in detail with reference to the accompanying drawing, in which FIG. 1 is a side elevational view of a coupling device according to the invention in its locking position, and FIG. 2 is a corresponding side elevational view of the device in its free position.

The coupling means illustrated in the drawing comprises for one part a journalling component in its entirety indicated at 1 fastened to the floor or to the chassis of the vehicle by means of a fastening fitting 2 or similar, and for another part a bar 3, which is pivotably journalled in the journalling component 1 by means of a shaft 4. In the position of the bar illustrated in FIG. 1, i.e. in the position in which the bar occupies functioning condition of the safety belt, the bar extends in bridge shape over a portion of the journalling component 1 in such a way that the bridge shaped portion 3a of the bar crosses the shaft 4 at a distance from the bar. This means that a band 18, entering into the safety belt assembly, in its cross direction, i.e. counted in the longitudinal direction of the bar 3, will extend past the shaft 4 in both directions. In the illustrated example of embodiment one end portion 3b of the bar is bent in J-shape, the shaft 4 being located near to the end of the bar. Between a part 3c of the end portion of the bar projecting past the shaft 4 and the fixed journalling component 1, a tension spring 7 is extending, which tends to pivot the bar 3 up into the position illustrated in FIG. 2. The journalling component 1 comprises two plates located at a distance in between them, between which plates the bar 3 is penetrating with its bent end portion. In the parts of the plates located nearest to the free end of the bar there are two slit shaped cuts 5 located in front of each other, which extend in the longitudinal direction of the bar 3, counted in the position of the same illustrated in FIG. 1. A release element in clamping manner clasping the side plates of the journalling component is indicated at 6, said release element being displaceably guided in the cross direction of the bridge portion 3a and the shaft 4 by cooperation between two sidewise projecting pins 8 and 9 on the journalling component and two corresponding slits 10 and 11 respectively in the release element 6, which slits are penetrated by said pins. The release element 6 moreover exhibits a slit shaped cut 12, which forms an angle to the cut 5 of the journalling component 1. Through the two slits 5 and 12 crossing one another a pin 13 is inserted, which in compulsory manner is displaceable in the longitudinal direction of the bridge portion 3a according to FIG. 1 by the movement of the release organ 6 relative to the holding component 1, whereby the common crossing point of the slits 5 and 12 is displaced. A pressure spring inserted between a seat dog 15 of the journalling component and a seat dog 16 of the release element 6 is indicated at 14, which spring tends to move the release element 6 to the position illustrated in FIG. 1. In the example of embodiment illustrated the dog 15 is shaped on a casing 17 surrounding the holding component 1, which casing for the sake of clearness is cut in the drawing. By both the slits 10 and 11 in between them exhibiting somewhat different directions, the release element 6 is given a pivoting movement in clockwise direction, when pressed down, which means a certain saving of space. When the release element 6 is pressed down against the bias of the spring 14, the pin 13 is displaced to the right from its position superposing the bar 3 and thus releases said bar which by action of the spring 6 is pivoted up into the position illustrated in FIG. 2. By the position of the shaft 4 below the band 18 of the safety belt as illustrated in FIG. 1, this shaft will take up a comparatively large part of the force transmitted to the bar 3 during a pulling action appearing in said band, by which arrangement the locking device can be brought to function with good margin of safety in spite of relatively slender dimensioning. The edge of the bridge portion 3a cooperating with the pin 13 can suitably tilt somewhat in downwards direction counted in direction to the right relative to the slit 5, which makes possible a release by applying a relatively small pressure on the release element 6 even if the band 18 transmits a relatively great load onto the bar 3. The coupling device is suitably placed with the release mechanism at the rear counted in the longitudinal direction of the vehicle.

The invention is not limited to the embodiment described above and illustrated in the drawing as an example, but can be varied as to its details within the scope of the following claims.

I claim:

1. A coupling device for use with vehicle roller safety belts particularly of the three point type having a chest band part which extends diagonally in use and continues in a hip-band part with both parts at the point of passing from one part to other are laid around a bar located at one side of a seat of the vehicle and fastened to the vehicle, said coupling device comprising a fitting attachable to the vehicle, a shaft being mounted on said fitting, said bar being pivotally mounted on said shaft with said bar extending perpendicular to said shaft, said bar having a bridge-shaped portion positioned for at times extending over said fitting, a locking element pivotally mounted on said fitting, a pin moveably mounted on said fitting and extending perpendicular to said bar and substantially parallel to the pivoting axis of said bar and positioned for engaging and retaining said bridge portion when extending over said fitting, said locking element being positioned for moving said pin to and from its bar retaining position during the pivoting of said locking element and resilient means tending to retain said locking element in its position with said pin engaging said bar, said fitting having a slot extending in the longitudinal direction of said bar when said bar extends over said fitting, said locking element having a slot extending at an angle to said first mentioned slot, said pin extending through both said slots whereby said pin can be displaced between its bar retaining position to its bar releasing position during pivoting of said locking element.

\* \* \* \* \*